United States Patent
Briem

(10) Patent No.: US 6,526,061 B1
(45) Date of Patent: Feb. 25, 2003

(54) METHOD FOR PRIORITIZING CELL STREAMS IN SYSTEMS WHICH TRANSMIT INFORMATION BY AN ASYNCHRONOUS TRANSFER MODE (ATM)

(75) Inventor: Uwe Briem, Maisach (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/091,087
(22) PCT Filed: Dec. 4, 1996
(86) PCT No.: PCT/DE96/02320
§ 371 (c)(1),
(2), (4) Date: Jun. 11, 1998
(87) PCT Pub. No.: WO97/24902
PCT Pub. Date: Jul. 10, 1997

(30) Foreign Application Priority Data

Dec. 28, 1995 (DE) .......................................... 195 48 985

(51) Int. Cl.$^7$ .......................... G01R 31/08; G06F 11/00; G08C 15/00; H04J 1/16; H04J 3/14; H04L 1/00; H04L 12/26; H04L 12/28; H04L 12/56
(52) U.S. Cl. .................................... 370/395.42; 370/235
(58) Field of Search .................................. 370/229–235, 370/395–401, 412–418, 11, 428, 429, 235.1, 464, 465, 468, 395.4, 395.41, 395.42, 395.43

(56) References Cited

U.S. PATENT DOCUMENTS

| | | | | |
|---|---|---|---|---|
| 5,231,633 A | * | 7/1993 | Hluchyj et al. ............. | 370/429 |
| 5,412,648 A | | 5/1995 | Fan ............................... | 370/414 |
| 5,463,620 A | * | 10/1995 | Sriram ......................... | 370/412 |
| 5,533,020 A | * | 7/1996 | Nyrn et al. .................. | 370/395 |
| 5,550,823 A | | 8/1996 | Irie et al. ..................... | 370/413 |
| 5,696,764 A | * | 12/1997 | Soumiya et al. ............. | 370/395 |
| 5,793,747 A | * | 8/1998 | Kline ........................... | 370/230 |
| 5,850,399 A | * | 12/1998 | Ganmukhi et al. .......... | 370/412 |
| 5,987,031 A | * | 11/1999 | Miller et al. ................. | 370/412 |
| 6,018,527 A | * | 1/2000 | Yin et al. ..................... | 370/412 |
| 6,031,822 A | * | 2/2000 | Wallmeier ................... | 370/235 |
| 6,049,526 A | * | 4/2000 | Radhakrishnan et al. ... | 370/229 |

FOREIGN PATENT DOCUMENTS

| EP | 0 603 916 | 6/1994 |
|---|---|---|
| EP | 0 681 385 | 8/1995 |

OTHER PUBLICATIONS

2334b IEICE Transactions on Communications E75–B(1992) Sep., No. 9, Tokyo, JP—Priority Control ATM for Switching Systems—Oh et al no month.

Virtual Spacing For Flexible Traffic Control—International Journal of Communication Systems, vol. 7, 307–318 (1994)—Roberts Aug. 1994.

* cited by examiner

Primary Examiner—Kwang Bin Yao
Assistant Examiner—Kevin Harper
(74) Attorney, Agent, or Firm—Fish & Richardson P.C.

(57) ABSTRACT

In up-to-date ATM network systems, data in cells is transmitted by the "weighted fair queueing scheduling" process. To use connection sections in a particularly efficient manner, the cell streams are prioritized on the basis of said known process in that the weighting factors allocated to a first quantity of cell streams are selected in a very different manner to the weighting factors allocated to the remaining quantity of cell streams.

3 Claims, 2 Drawing Sheets

METHOD FOR PRIORITIZING CELL STREAMS IN SYSTEMS WHICH TRANSMIT INFORMATION BY AN ASYNCHRONOUS TRANSFER MODE (ATM)

BACKGROUND OF THE INVENTION

The invention relates to a method for prioritizing information to be transmitted in cell streams.

In up-to-date ATM systems, information is transmitted in cells. These cells have a header part and an information part. The connection information is stored in the header part and the traffic data to be transmitted is stored in the information part. The actual transmission usually takes place via connection sections between the transmitter and the receiver. In the process, there may possibly be the need to utilize the connection sections in such a way that a plurality of transmission devices transmit the cell streams originating therefrom via the same connection section.

In order to be able to transmit the respective cell streams in accordance with the requirements of the individual cell streams, a so-called WEIGHTED FAIR QUEUING SCHEDULING method has become established as the state of the art. The corresponding conditions are indicated, for example, in the publication "Virtual Spacing for Flexible Traffic Control", J. W. Roberts, International Journal of Communication Systems, Vol. 7, 307–318 (1994). Here, the individual cell streams are allocated different weighting factors with which the actual transmission procedure to the individual connection sections is controlled. In order to understand this better, please refer to FIG. 3.

Here, cell streams 1 . . . n are disclosed by way of example. The n cell streams are directed by a transmission device DEMUX in the direction of one or more receivers. In practice, only one common connection section is used in this context. In addition, weighting factors $r_1 \ldots r_n$ are allocated to n cell streams. For the sake of easier comprehension, it will be assumed that only two cell streams, namely the cell streams 1, 2 are to be routed via one connection section. In addition, the connection section is to have a maximum transmission capacity of 150 Mbit/sec. The two cell streams 1 and 2 are allocated weighting factors $r_1=2$ and $r_2=1$. The effect of this is that cell stream 1 is transmitted at a transmission rate of 100 Mbit/sec and cell stream 2 is transmitted at only 50 Mbit/sec if cells are waiting to be transmitted.

The problem with such a procedure is that the capacity utilization of the connection is not ensured to an optimum degree, in particular in terms of different services. This is particularly due to the fact that, for example, connections with guaranteed service quality have to be treated differently from, for example, connections without any service quality guarantees. Thus, the former are, as a rule, switched through as a function of the service quality parameters and/or connection parameters, something which is less significant in the case of the latter. Here, the necessary data are transmitted only if the connection section is otherwise subjected to low loading. This is the case in particular if the cell streams do not fully utilize the available transmission capacities.

The invention is based on the object of indicating a way in which the capacity utilization of connection sections can be controlled in an optimum and efficient fashion when the WEIGHTED FAIR QUEUING SCHEDULING method is being used.

The invention is achieved on the basis of the features disclosed in the preamble of Patent claim 1, by means of the features of the characterizing part.

An advantage with the invention is, in particular, that prioritization is achieved by selection of extreme values of the weighting factors. This entails the advantage that the cell streams via the respective connection section can be controlled as a function of these priorities, and optimum capacity utilization is thus ensured.

Further refinements of the invention are given in the subclaims:

SUMMARY OF THE INVENTION

According to claim 2 there is provision for the cell streams to be formed from a plurality of substreams to which, if appropriate, different weighting factors are allocated in each case. This entails the advantage that the transmission of information within one connection section can be carried out with different priorities.

In accordance with claim 3 there is provision that, if appropriate, different weighting factors are allocated to the substreams of a cell stream. This entails the advantage of prioritizing information within a cell stream.

In accordance with claim 4 there is provision that at least one counting device is provided per substream and priority, the counter reading of which is incremented when a cell of the respective substream arrives and is decremented when a cell of the respective substream leaves. This entails the advantage that the occupancy level of cells in the system can be detected.

In accordance with claim 5 there is provision for a scheduler to pass on the cells according to the valuation of the counting devices.

This entails the advantage of a particularly efficient utilization of the connection section.

The invention is explained in more detail below with reference to an exemplary embodiment.

DESCRIPTION OF THE PREFERRED EMBODIMENTS

Figure 1:
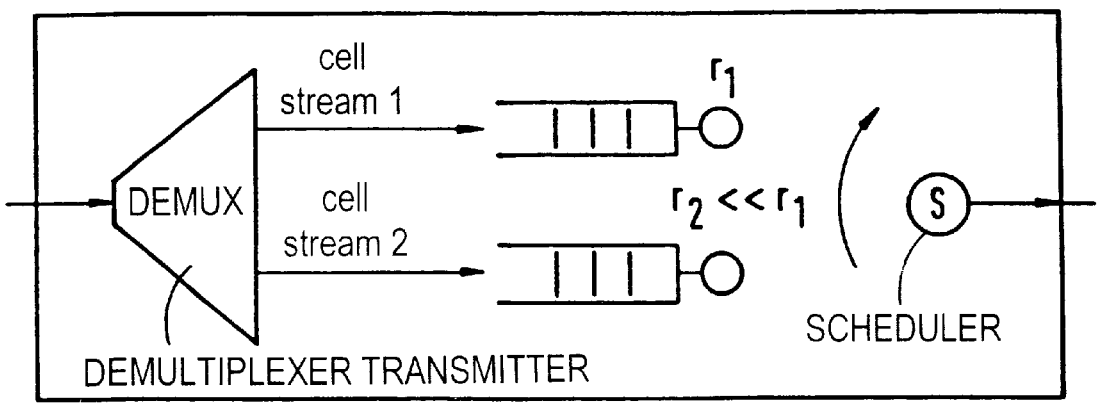
FIG. 1 shows a general type of the inventive method.
Figure 3:
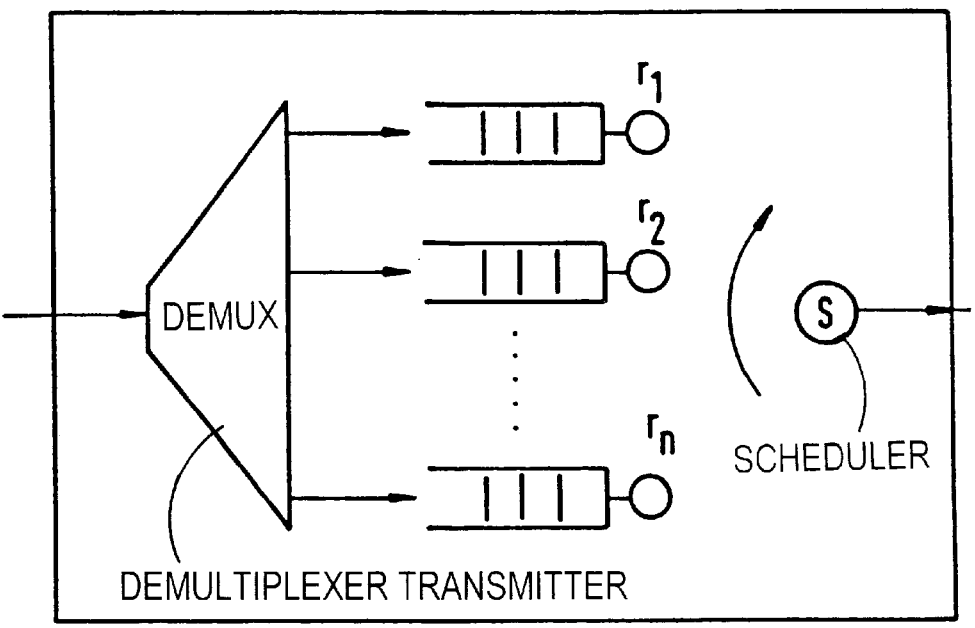
FIG. 3 shows the prior art on which the invention is based.

FIG. 1 explains in more detail the method according to the invention by means of a general exemplary embodiment. Here, a cell stream i upstream of the transmission procedure is provided with a weighting factor $r_i$. FIG. 1 shows two cell streams, namely cell stream 1 and cell stream 2. Starting from a transmitter device DEMUX, which is usually designed as a demultiplexer, they are transmitted via a common connection section to one or more reception devices. Here, one of the cell streams, for example cell stream 1, is allocated a weighting factor $r_1$, while the remaining cell stream, namely cell stream 2, is allocated a weighting factor $r_2$. So that one of the two cell streams can then be prioritized in terms of the transmission, one of the weighting factors, for example $r_2$, selected such that it is very much smaller than the remaining weighting factor $r_1$. Very much smaller should mean here that the quotient of $r_1$ and $r_2$ is very much larger than 1. For practical considerations, a factor of 100 has proven perfectly acceptable.

However, in practice, a plurality of cell streams occur, and these have to be transmitted via a common connection section. For further considerations it will be assumed that this plurality of cell streams will be n. In addition, it will be assumed that cell streams are to be transmitted with only 2 priorities. A distinction will therefore be made only between a high priority and a low priority.

In this case, all the high-priority cell streams are allocated the same weighting factor $r_i$ while all the low-priority cell streams are allocated the same weighting factor $r_j$. It will be assumed, by way of example, that the number of high-priority cell streams is $n_h$. For the high-priority cell streams the following therefore applies: $1 \leq i \leq nh$. In addition, the number of all the low-priority cell streams is $n_1$. Here, it is true that $n_h+1 \leq j \leq n_h+n_1$. In addition, according to the invention the weighting factors of the lower-priority cell streams are divided by a factor C1, which ultimately means that the following is true $(r_j/C1)^*C2 < r_i$ for all i, j.

The constant factor C2 should be very much larger here than 1. Here too, an order of magnitude of 100 has come to be accepted for practical considerations.

Figure 2:
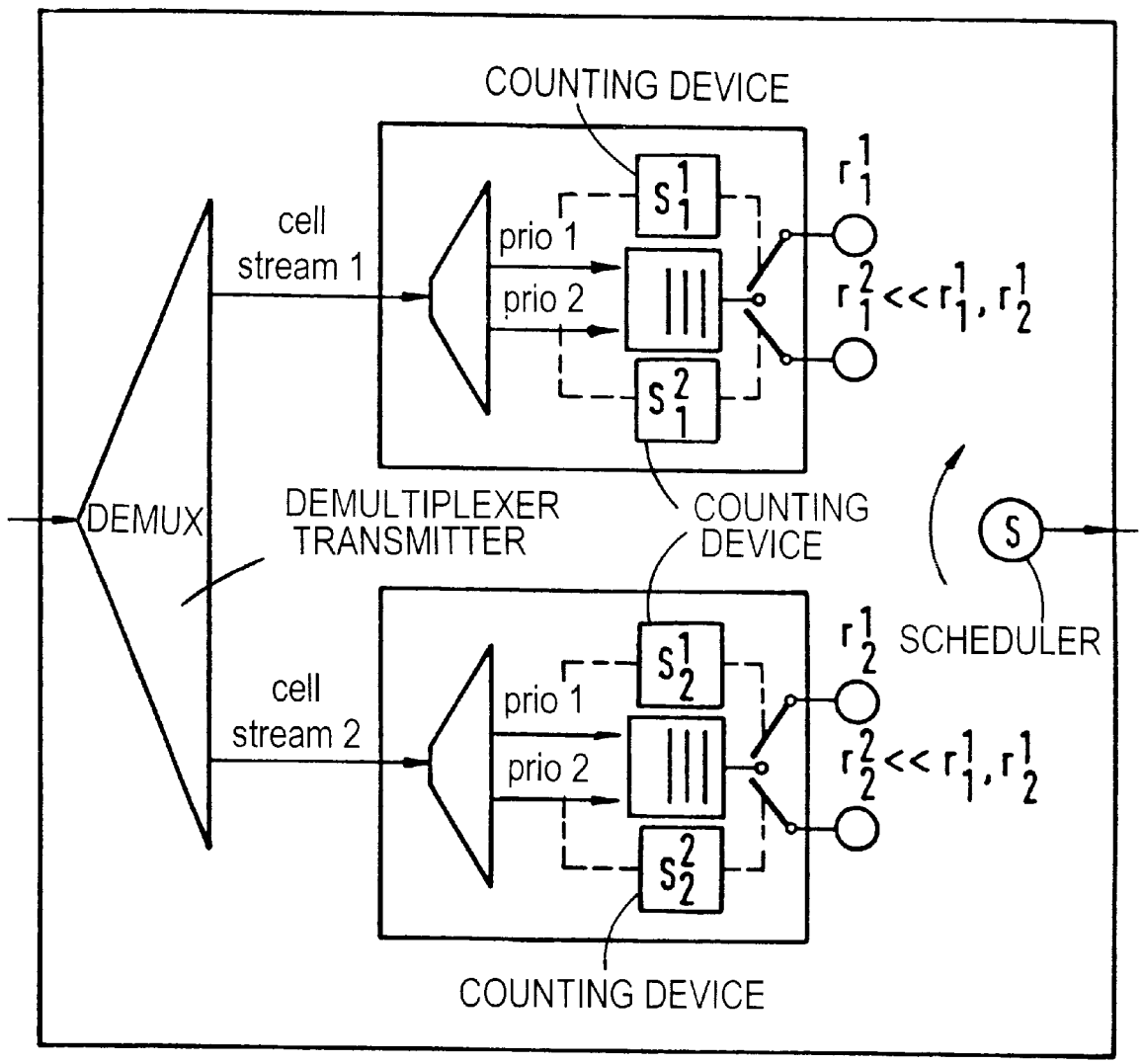
FIG. 2 shows a special embodiment of the inventive method.

FIG. 2 illustrates a further refinement of the invention.

Here, it is assumed that a cell stream has a plurality of substreams with a different priority in each case. However, the substreams cannot readily be derived from the mainstream since, with ATM cells, this may possibly lead to messages overtaking one another. However, the substreams whose priority levels differ can be prioritized according to the principle presented above by providing and weighting the number of high-priority cells and the number of low-priority cells of each cell stream with the respective weighting factors.

In accordance with FIG. 2, the variable 1 signifies the number of the substream and the variable k signifies the number of the superordinate cell stream. In addition, each cell stream is allocated two weighting factors $r_k^l$ (l=1, 2). The allocation of these weighting factors causes a single cell stream to look like two separate cell streams to the scheduler S. Here, the weighting factors $r_k^1$ are calculated in the fashion specified above. The scheduler S defines the sequence in which the cells are passed on.

In addition, each of the substreams is allocated a counting device $S_k^l$ in terms of its priority, a matrix of counting devices being produced. Such counting devices are used to calculate the difference between the number of cells which have penetrated the system and the number of cells which have left the system via the scheduler S for each cell stream k and each priority 1. The counter reading of the counting device $S_k^l$ is incremented by 1 if a cell of the cell stream k with the priority 1 penetrates the system. The counter reading of the counting device is decremented by 1 if a cell with the priority 1 of the cell stream k is passed on by the scheduler S. If the counting device has a value greater than 0, this means that the number of incoming cells is greater than the number of transmitted cells for this specific substream and this specifically allocated priority. In this case, further cells of the same priority 1 of the same substream k may be transmitted by the scheduler S. However, if the counting device has a counter reading of 0, this means that the number of incoming and outcoming cells is identical; therefore, no further cells for this substream are transmitted by the scheduler S. The cells transmitted by the scheduler S do not have to have the priority of the decremented counter.

From the relationship described above it emerges that if a cell stream has only "priority 1" cells and the remaining cell streams have "priority 2" cells, the cell streams of the higher priority have precedence in terms of the transmission. If all the cell streams have cells with the same priority, the active cell streams are treated as if the cells have no priority whatsoever. If cell streams have two priorities, only the substreams whose counting device $S_k^1 > 0$ are treated in accordance with the allocated weighting factor $r_k^1$. Substreams whose counting device $S_k^1 = 0$ are treated almost always only if $S_k^1 = 0$ for all k. In this case, each low-priority cell stream k is held back in terms of its weighting factor $r_k^1$.

Although various minor changes and modifications might be proposed by those skilled in the art, it will be understood that my wish is to include within the claims of the patent warranted hereon all such changes and modifications as reasonably come within my contribution to the art.

I claim:

1. A method for prioritizing information to be transmitted in asynchronous transfer mode cell streams, comprising of the steps of:

forming a plurality of cell streams each having a plurality of cells, the cell streams being directed via a common connection section to further transmission devices in the asynchronous transfer mode;

allocating different weighting factors during a transmission procedure;

allocating weighting factors to a first quantity of the cell streams having a lower priority which are many times smaller than the weighting factors allocated to a remaining quantity of the cell streams having a relatively higher priority; and the weighting factors of the lower priority cell streams being divided by a factor C1 such that $(r_j/C1) \times C2 < r_i$ where $r_i$ is the weighting factor for all the high-priority cell streams, $r_j$ is the weighting factor for all the low-priority cell streams, and wherein C2 is very much larger than 1.

2. A method for prioritizing information to be transmitted in asynchronous transfer mode cell streams, comprising the steps of:

forming a plurality of cell streams, each having a plurality of cells, the cell streams being directed via a common connection section for further transmission in the asynchronous transfer mode, said common connection section having a given maximum transmission rate capacity;

allocating a weighting factor parameter during a transmission procedure to each of the cell streams, a value of the weighting factor parameter determining a transmission rate of the respective cell stream based on the given maximum transmission capacity;

at least one of the cell streams corresponding to a connection requiring a guaranteed service quality while at least one of the other cell streams corresponding to a connection without a service quality guarantee; and providing the at least one cell stream corresponding to the guaranteed service quality with a value of the weighting factor parameter which is many times greater than a value of the weighting factor parameter allocated to all of the cell streams corresponding to the connections without the service quality guarantee, so that the same weighting factor parameter used for determining the transmission rate for each cell stream is also used to determine whether the respective cell stream has a guaranteed service quality.

3. The method according to claim 2, including the step of providing the values of the weighting factor parameter corresponding to the cell streams without the service quality approximately 100 times smaller than the values of the weighting factor parameter allocated to the at least one cell stream having the guaranteed service quality.

* * * * *